United States Patent [19]

Baker

[11] 4,274,527
[45] Jun. 23, 1981

[54] APPARATUS AND METHOD FOR UNIFORMLY SPREADING A FLOWING STREAM OF DRY SOLIDS

[76] Inventor: John H. Baker, R.D. #2, Box 109B, Port Murray, N.J. 07865

[21] Appl. No.: 837,206

[22] Filed: Sep. 27, 1977

[51] Int. Cl.³ .............................................. B65G 11/20
[52] U.S. Cl. ...................................... 193/32; 193/2 B; 222/564; 414/299
[58] Field of Search ............... 214/17 C; 193/2 C, 32, 193/3, 40, 2 B, 2 R, 27; 222/564, 547; 414/293, 299, 205, 206, 208; 110/232, 105, 108, 116, 293

[56] References Cited

U.S. PATENT DOCUMENTS

| | | | |
|---|---|---|---|
| 1,591,479 | 7/1926 | Erickson | 193/2 R |
| 1,813,590 | 7/1931 | Stock, Jr. | 193/2 R |
| 1,947,011 | 2/1934 | Karthäuser | 193/2 R |
| 2,634,842 | 4/1953 | Caylor | 193/32 |
| 3,659,691 | 5/1972 | Leutelt | 193/2 C |
| 4,040,530 | 8/1977 | Mahr et al. | 222/564 X |

FOREIGN PATENT DOCUMENTS 1222853 8/1966 Fed. Rep. of Germany ............ 193/32
1046898 10/1966 United Kingdom ...................... 193/32

Primary Examiner—Stephen G. Kunin
Assistant Examiner—E. G. Rishell, Jr.
Attorney, Agent, or Firm—H. Hume Mathews

[57] ABSTRACT

Apparatus and method for uniformly spreading a flowing stream of dry solids, which may include solid particles and lumps of varying sizes, with minimal segregation, which utilizes an adjustable dam having a curved crest for forming in the flowing stream a mass of solids in the shape of a segment of a cone, over the surface of which the stream is spread from a relatively narrow stream at the apex of the cone to a relatively wide stream at the base of the cone, and including a mechanism for adjusting the dam to vary the degree of transverse arc curvature of the spreading surface. As an alternative, the spreading surface may be formed by a series of elongated, adjustable bars.

6 Claims, 15 Drawing Figures

U.S. Patent Jun. 23, 1981 Sheet 1 of 5 4,274,527
FIG.1
FIG.1A
FIG.3
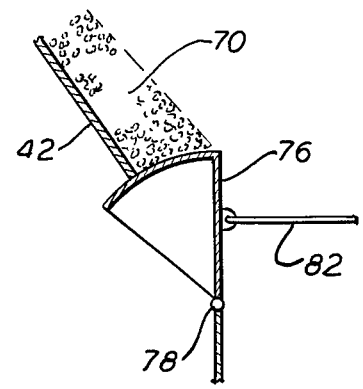
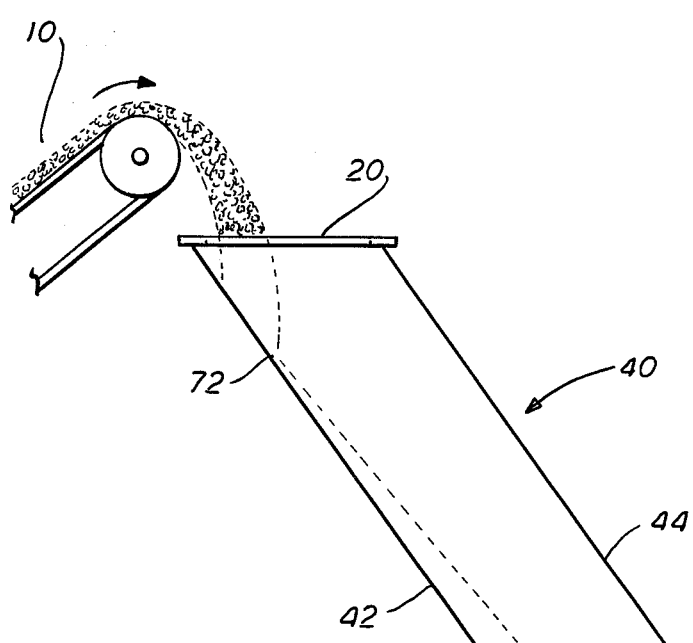
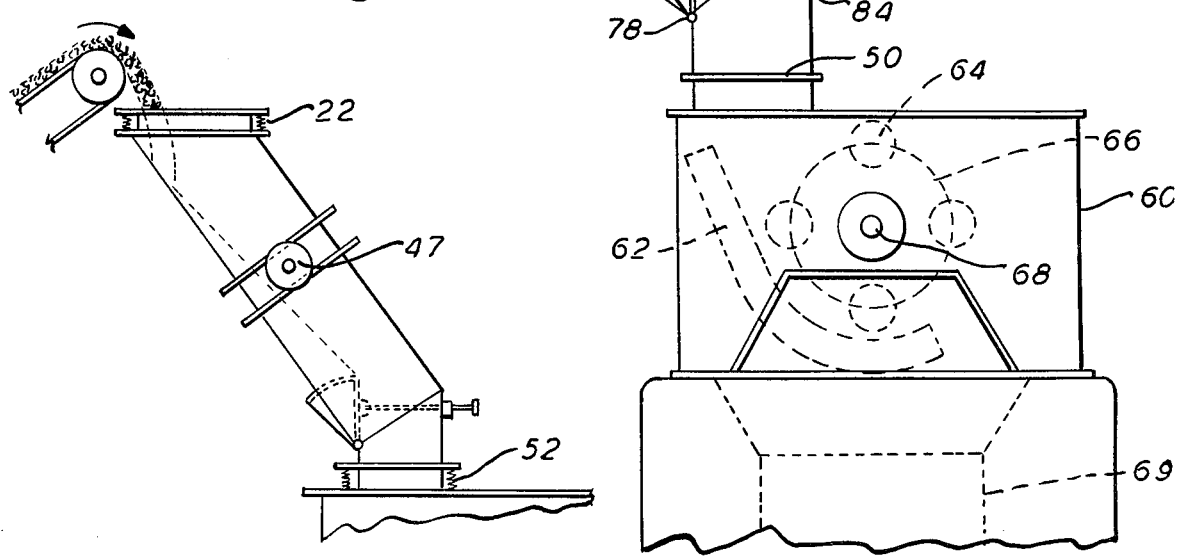

APPARATUS AND METHOD FOR UNIFORMLY SPREADING A FLOWING STREAM OF DRY SOLIDS

BACKGROUND OF INVENTION

A number of different types of devices have been used in the past for the spreading of streams of dry solids from a relatively narrow to a relatively wide stream.

Sloped flat plates down which the stream flows, and spreads as it flows, have been used. But such a device provides only limited spreading and has the further disadvantage of causing particle segregation because the larger particles migrate to the edges of the stream as the stream spreads.

Sloped plates having baffles attached thereto for mechanically deflecting portions of the stream have been used but these produce erratic spreading patterns under variable conditions, i.e., of flow rate, moisture content of the dry particles, etc.

Vibrating or shaking feeders have been used but these are unduly complicated and costly due to the necessity for incorporation of an additional piece of machinery (powered machinery) in the system. Further, they have substantially the same performance limitations as the sloped plate device referred to above.

Surge bins with feeders (generally vibrating feeders) have been used but these also are costly, require excessive headroom, and necessitate the provision of controls which interrupt or vary stream flow to prevent overfilling of the bin.

Chutes having metal plates which form fixed conical surfaces provide improved results when operated under full head as with a surge bin and feeder (referred to above) but they still, when so operated, have the limitations of the surge bin device. When operated under free flow conditions metal conical chutes of fixed cross-section are erratic when changes in conditions are encountered, such as variations in the velocity or flow rate of the solid stream, or variations in the physical characteristics of the dry solids which form the flowing stream. Further, they do not perform well when supplied with an off center feed.

Power operated screws, agitators and other spreaders are costly and do not accommodate easily to variations in the dry solid stream (particularly oversized lumps), as referred to above.

SUMMARY OF INVENTION

According to the present invention, the problems inherent in the prior art devices, including those specifically discussed above, are obviated through the provision of a novel spreading apparatus, and method, wherein a sloped plate type spreading device is combined with an adjustable dam, having a curved crest or lip of a particular shape, which so blocks the flow of a portion of the dry solid stream flowing down said plate as to form in the flowing dry solid stream a stationary, adjustable mass having an outer conical surface, said stationary mass extending from an apex at the top of the sloped plate to a base which rests against the adjustable dam. The sloped plate is thus provided on its face with a stationary mass of the particles which comprise the dry solids stream, the stationary mass being in the form of a segment of a cone having its apex near the top of the plate and its base resting against the upstream face of the dam. The actual spreading surface of the stationary mass, over which the solid stream spreads as it flows from the apex to the base, is conical. Such a surface, for particular flow and material conditions of the dry solid in the stream, will effectively spread the stream many fold from a relatively narrow width at the apex to a very wide width at the base. Further, such spreading, effected by the conical surface of the stationary particle mass, will be uniform, with minimal segregation of the various sizes of the flowing particles. The degree of curvature of the spreading surface of the stationary mass, transversely of the direction of flow of the dry solids stream, can be modified to accommodate variable conditions in the dry solids stream by adjusting the angular position of the dam. Adjustment of the dam will change the angle of its crest or lip relative to the direction of flow of the dry solids stream so that when the dam is in the fully open or "non-blocking" position no stationary mass will be formed in the solids stream; when the dam is in the fully "closed" or maximum blocking position a stationary mass will be formed in the solids stream with a conical spreading surface of maximum degree of curvature; and when the dam is in an intermediate position a stationary mass will be formed in the solids stream with a conical spreading surface of intermediate degree of curvature.

DESCRIPTION OF DRAWINGS

In the drawings:

FIG. 1 is a side elevational view of a presently preferred embodiment of the present invention in which the spreading device of the invention is interposed between the discharge end of an elevating belt conveyor and the inlet opening of a crusher or mill for pulverizing the dry particles or lumps fed to the crusher by the spreading device.

FIG. 1A is an enlarged section of a portion of FIG. 1.

FIGS. 2A and 2B are illustrations of the dam 76 having crests generally in the form of a parabola and a hyperbola, respectively.

FIG. 3 is a side elevation, on a reduced scale, of a portion of the apparatus of FIG. 1, modified to include flexible connections and a vibrating device which allow the spreading device of the invention to be vibrated, thus reducing the angle of repose of the material flowing therethrough and reducing headroom.

DETAILED DESCRIPTION OF PREFERRED EMBODIMENT

Figure 2:
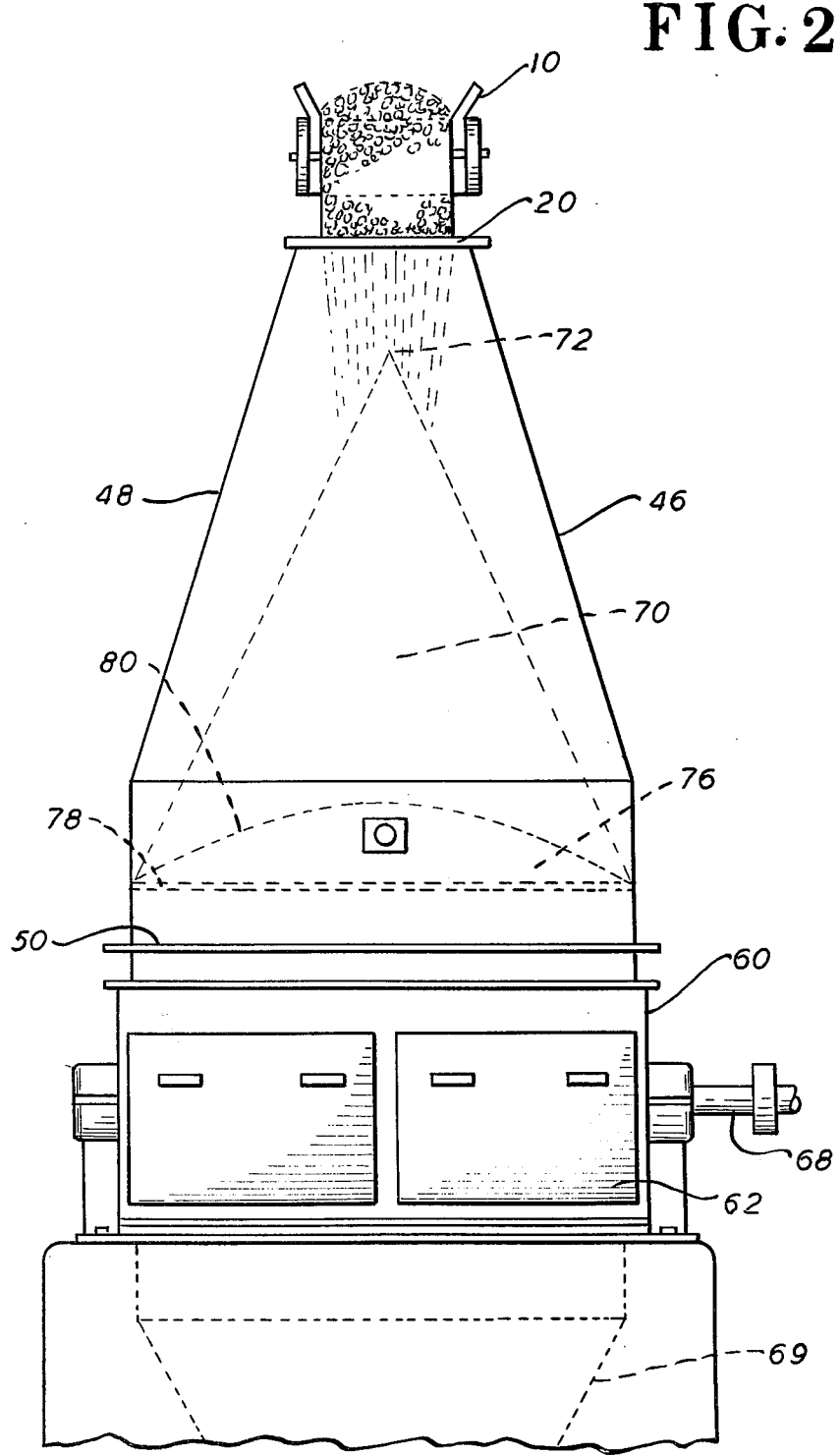
FIG. 2 is a front elevational view of the apparatus of FIG. 1.

In the presently preferred embodiment of the invention as shown in the accompanying drawings, the invention is utilized to spread a flowing stream of particulate solids, for example, coal being transported to a crusher, while the particulate solids are in transit.

Referring to FIGS. 1 and 1A, the particulate solid stream, herein sometimes referred to as the dry solids stream, is delivered by a belt conveyor 10 to the inlet opening 20 of a spreader chute 40 in the form of an expanding duct extending from the relatively small size rectangular inlet opening 20 to the relatively large size rectangular discharge opening 50. The bottom wall 42 of chute 40 is of flat sheet metal, and the top wall 44 is of flat sheet metal lying in a plane parallel to the plane of the bottom side 42. The two side walls of the chute, 46 and 48, also are of flat sheet metal but they diverge from the inlet 20 to a position just upstream of the discharge opening 50 so that the chute is in the form of a truncated duct, inclined with respect to the vertical, which expands in width (although not in height) along its length from the inlet opening 20 to the said position just upstream of the discharge opening 50.

The bottom wall 42 of the chute is smooth, flat and inclined at such an angle that the stream of dry particles dropped through the chute inlet opening 20 by conveyor 10 onto the top portion of chute wall 42 will flow by gravity down the face of the bottom chute wall 42, and from there on out the chute discharge opening 50 into the crusher 60.

As will be seen from a comparison of FIG. 2 with FIG. 1, the inlet opening to the crusher (which is also the discharge opening 50 of the spreader chute 40, is considerably wider (for example, from 4 to 5 times wider) than the width of the dry solids stream as it leaves the conveyor 10 and enters the inlet 20 of the chute. It is therefore necessary to spread the dry solids stream as it passes through the chute, and this should be done, in order that the crusher 60 may perform its function effectively and efficiently, uniformly and without substantial segregation of the dry solids stream, either segregation by particle size or segregation in particle density.

In the embodiment of the invention shown in FIGS. 1 and 2, spreading of the dry solids stream is accomplished by forming in the stream of dry solids flowing down the chute 40 a stationary mass 70 of dry solids which mass has a narrow, or point, apex 72 and a wide base 74, and generally conforms to the shape of a segment of a cone.

This stationary mass 70 of dry solids is formed in the flowing dry solids stream by a pivoted control dam or gate 76, hinged at 78 to the bottom chute wall 42 of the discharge end thereof. As shown in FIG. 2, the control dam 76 has a curved upper crest or lip 80, over which the dry solid stream flows after the stationary mass 70 has been formed by the blockage of that portion of the stream whose flow is stopped by the control dam 76. The curved upper crest or edge 80 of the control dam 76 is made in the shape of a conic section, preferably parabolic or hyperbolic, so that when the dam is in one of its intermediate positions the stationary mass of dry solids retained by the dam will have the general shape of a segment of a right circular cone whose apex is at point 72 and whose base rests against, and is coextensive with, the upstream face or surface of the dam 76.

The lower edge or bottom of the control dam 76 lies in a straight line, parallel to the plane of the bottom chute wall 42. The dam is hinged or pivoted to the bottom chute wall at 78 and it can be adjusted angularly about this hinge by the adjustment screw and nut arrangement 82, 84. The range of movement of the dam is from a fully "open" position in which it has been moved counterclockwise about hinge 78 until its back or downstream face lies in the same plane as the bottom chute wall 42, to form in effect a continuation thereof, or to a fully "closed" or maximum blocking position in which the dam has been rotated clockwise about hinge 78 until its upper crest or edge 80 is spaced the maximum distance from the plane of the bottom wall 42 of the chute.

In the fully open position of control dam 76, it presents no obstruction to the flow of dry solids down the chute 40, and the spreading of the dry solid stream as it flows down the chute is substantially the same as that which would occur were the control dam not present, i.e., only limited spreading would occur and most of the stream would flow over the central portion of the dam. There would be material segregation, i.e., the larger particles would tend to migrate to the opposite edges of the stream.

In the closed, or maximum blocking position of the dam 76, overspreading would occur, resulting in two streams over the opposite edges of the dam 76, with little or no flow over the central portion of the stream.

When the dam is adjusted angularly about its hinge to the proper intermediate position, however, the contour of the outer or spreading surface of the stationary mass of dry solids, retained by the blocking action of the dam, will be generally conical in shape, and with the proper adjustment will cause the particles and lumps which form the dry solids stream to spread evenly and uniformly, with minimum segregation, over the entire width of the chute. Once the stationary mass has built up to the point where its thickness is equal to the height of the control dam (the distance between the crest of the dam and the plane of bottom chute wall 42) the dry solid stream will spill over the crest of the dam and establish stable flow conditions wherein it spreads as it flows over the conical surface of the stationary mass and spills over the curved upper crest or lip 80 of the control dam 76 as a wide, uniform, homogeneous stream. Because the dam 76 is adjustable, the shape of the outer or spreading surface of the stationary mass can be adjusted, or varied, so as to vary the spreading characteristics of the said surface. It has been discovered, according to the present invention, that if the dam is angularly adjusted about its hinge to provide the proper shape or contour on the spreading surface of the stationary mass for the particular flow characteristics of the material being spread, that a dry solids stream of such material can be spread laterally, and evenly, from a relatively narrow width as it enters inlet 20 to a relatively great width equal to the width of the control dam 76. As will be seen in FIG. 2, this may be the full width of the discharge opening 50. For example, the stream may readily be spread from a width of three feet at inlet 20 to a stream width of 12 feet where it exits the spreader chute and is discharged into the crusher 60.

Furthermore, the spreading action as described above, according to the present invention, can be accomplished with great uniformity (i.e., with even or uniform rates of dry solids flow across the full width of the discharge opening) and with no substantial segregation of particles either by size variations or by variations in physical characteristics.

When in its intermediate positions, the crest or lip 80 of the dam will "look to" the flowing dry solids stream as if it has a different curvature than it actually has in fact. For example, when in the fully blocking position the crest of the dam at its center (halfway between its opposing edges) will be at maximum height above the plane of the bottom chute wall 42, whereas in the fully "open" dam position the crest 80 would have, as "looked at" from the direction of the stream flow, no curvature, and no height. It would become in effect not a dam but only a continuation of the chute wall 42.

In the in-between positions of the dam the crest 80 would appear from the viewpoint of the dry solids stream to have curvatures in-between the fully open, "straight line," position and the maximum blocking, "maximum curvature arc", position. Regardless of how the dam crest may appear, so far as its curvature is concerned, as "looked at" by the flowing dry solids stream, the essential thing is that by this invention the contour and shape of the surface that actually effects the spreading can be varied, and selected, by angularly adjusting the dam about its hinge 78. It is the contour or shape of the upper surface of the stationary mass 74 that effects the spreading of the dry solids stream flowing thereover, and it is this contour or shape that can be varied, and selected, by rotating the dam 76 about its hinge 78 and then fixing it in the desired angular position.

Thus, in the embodiment of the drawing, adjustment of the angular position of control dam 76 about hinge 78 with adjustment screw 82 will change the spreading characteristics of the device so that for any particular kind of material, or type of material, or condition of material constituting the dry solids stream a particular dam position can be selected which will provide the spreading characteristics desired.

FIG. 3 illustrates an embodiment of the invention wherein headroom may be conserved by reducing the angle of repose, in the chute 40, of the material which constitutes the dry solids stream. In FIG. 3, the chute is supported at its upper and lower ends by flexible supports 22 and 52, respectively. A vibrator 47 is mounted on the chute at an intermediate position so that, when the material is flowing through the chute, the chute and its contents are subjected to continuous vibrations. These vibrations enable the material to flow through the chute at less steep chute angles than otherwise would be required and thus enable the headroom, or vertical distance between the inlet end 22 and the outlet end 52, to be less than would be required were the vibrator not provided.

In FIG. 4, another modification is shown which enables the discharge opening of the chute to be positioned under, or substantially under, the inlet opening, and/or to effect the spreading of the dry solids stream in two steps or phases, using two adjustable dams. A first chute section 41, with an adjustable dam 77, spreads the stream from the width it has as it leaves the conveyor 10′ and drops through the chute inlet 20′ to an intermediate width at the end of the first chute section 41. The stream is then discharged, as it flows over the first dam 77, into the inlet of a second chute section 43, having at its outlet a second adjustable dam 79. This second chute section further spreads the stream (in the same manner as described above with respect to FIGS. 1 and 2) to its final width as it flows over the crest or lip of the second dam 79 and pours into the entrance opening 50′ of crusher 60. As will be seen, the second chute section 43 is inclined at a reverse angle to the first chute section 41 so that the final discharge opening from the two chute sections can be, if desired, located immediately beneath the inlet opening to the first chute section.

FIG. 5 illustrates the principle of operation of the spreading device of the other figures. In FIG. 5, a stream of dry solids flowing downwardly through an inlet 20 falls on an inclined surface 42, on which is retained by an adjustable dam 76, a stationary mass 70 of the dry solids. Because the dam 76 has a curved upper crest or lip 80, over which the dry solids stream flows, and can be angularly adjusted about its hinge 78, the stationary mass 70 can be made to assume the shape of a segment of a cone, having an outer surface whose shape is generally conical. This conical surface causes the dry solids stream to spread, as shown by the downwardly diverging arrows, to the full width of the chute as the dry solids stream pours over the crest or lip 80 of the dam. By adjusting the angle of the dam about its axis of adjustment 78, the apparent degree of transverse curvature of the crest or lip (transversely with respect to the direction of stream flow), when regarded from a position upstream of the dam and looking downstream toward the dam, can be varied until a particular contour or shape is obtained for the spreading or outer surface of the stationary mass 70, and which will provide the exact spreading characteristics desired for the dry solids stream flowing thereover.

FIG. 6 shows that when the dam is adjusted counterclockwise about its axis of rotation 78 until it is in the fully open or non-blocking position it becomes in effect a continuation of the flat chute wall 42, and the only spreading that will occur will be the same as that which would result from flow of the dry solids down a flat sheet.

As will be seen in FIG. 2, the dam 76 is of zero height (above the plane of chute bottom wall 42, at its opposite ends. FIG. 7 illustrates, by comparison with FIGS. 1A and 6, how the central dam height may be varied (while still maintaining zero height at its ends) by adjustment of the dam angularly about its axis of rotation 78. The maximum spreading effect will of course be provided when the dam is in its maximum blocking position wherein its crest 80, at the central portion thereof, is at maximum height above the plane of the bottom chute wall 42.

Figure 8:
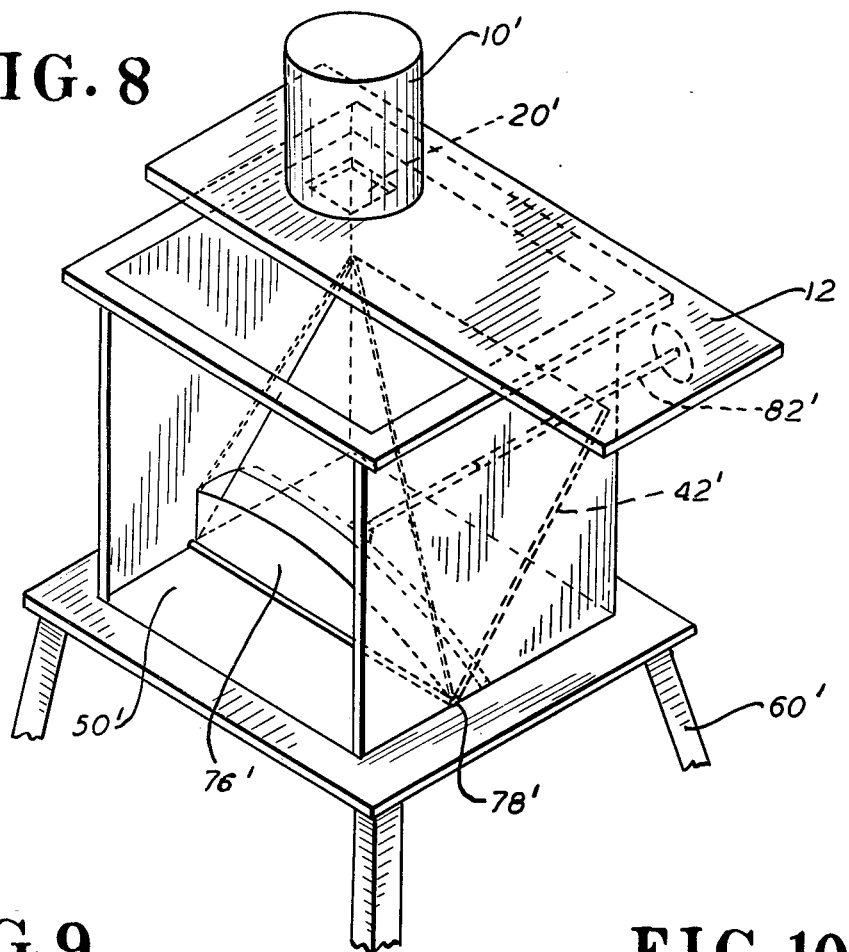
FIG. 8 is a perspective view of a spreader constructed according to the invention in which the spreader control dam is non-symmetrical, and the inlet feed stream is offset laterally with respect to the outlet opening into which the stream is fed after being spread.
Figure 9:
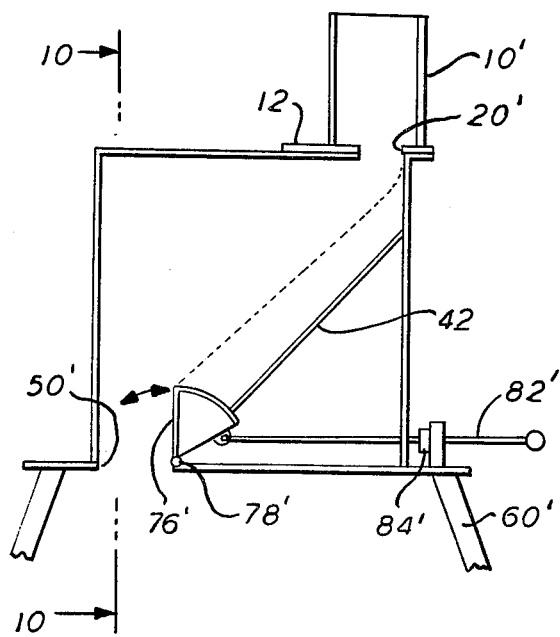
FIG. 9 is a cross-section of FIG. 8, illustrating the preferred position of the dam operating lever underneath the bottom plate of the chute and (in dotted lines) the stationary mass of stream particles formed by the control dam when it is in substantially the maximum blocking position for the particular form of dam shown in the Figure.
Figure 10:
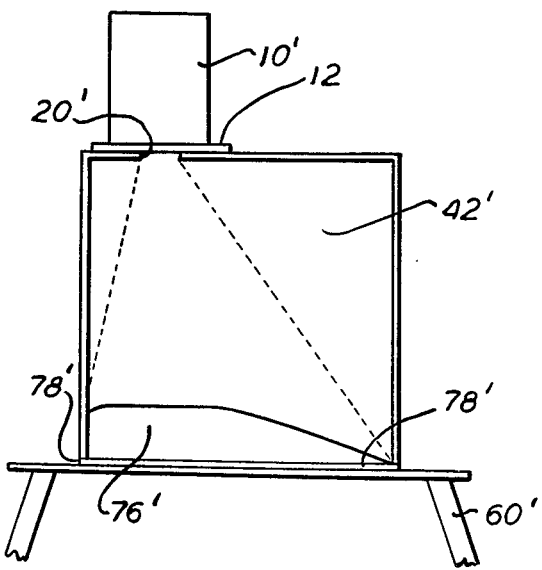
FIG. 10 is a cross-section along the line 10—10 of FIG. 9.

The spreading device of the present invention can also be used to spread a solids stream flowing from an inlet which is offset laterally with respect to the center of the opening into which the spread stream is to be discharged, as shown in FIGS. 8, 9 and 10. In this modification, the inlet 20', fed with a dry solids stream from a conduit 10', is located on one side of the bottom wall 42' of the spreading chute onto which the stream falls, and the center of the discharge opening 50' is, accordingly, displaced laterally with respect to the inlet opening. By forming the adjustable dam 76' so that its maximum height is located under the inlet, and its minimum height displaced laterally from the inlet in the same direction the outlet opening is laterally displaced, as shown in FIGS. 8 and 10, the dry solids stream can be spread to a greater extent in the direction of said displacement, so that when it enters the discharge opening, after spreading, it will be not only uniformly spread to the desired extent but further, will be centered with respect to the discharge opening.

Figure 11:
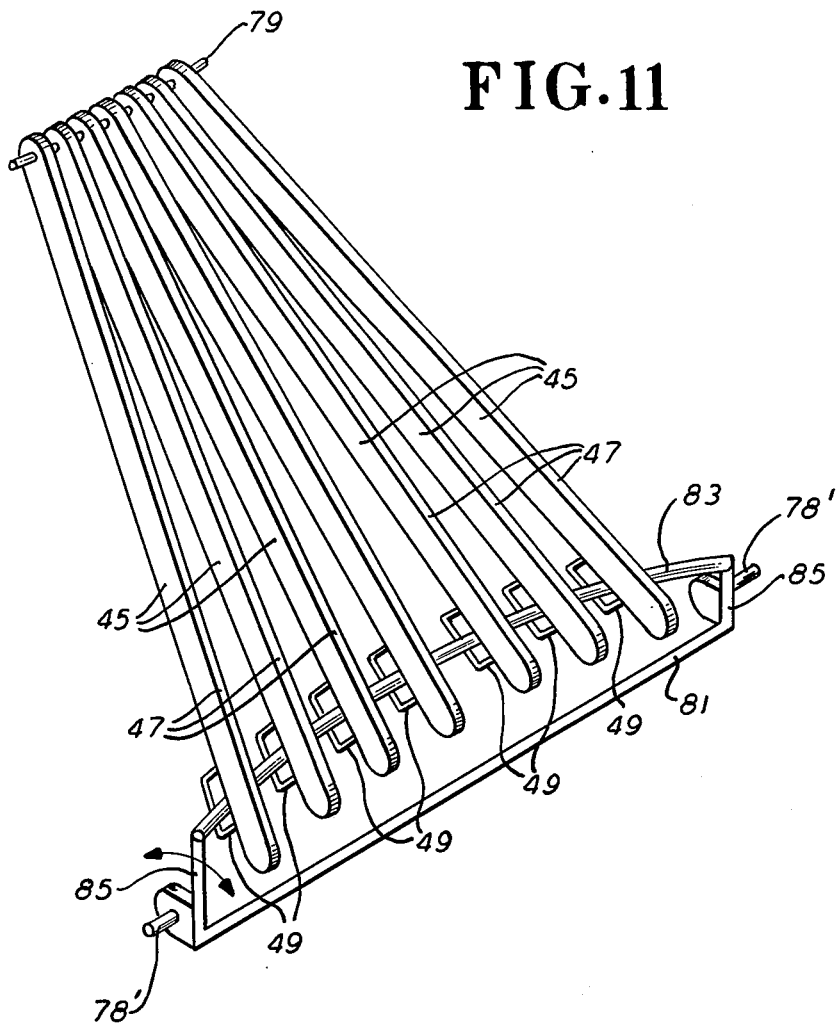
FIG. 11 is a partial schematic perspective view of a modification of the invention in which a series of adjustable elongated slide bars are positioned in the flowing dry solids stream, extending in the direction of stream flow, and positioned in a selected, generally conical form by angular adjustment of an arc shaped rod. The spacing of the slide bars can be varied to meet the particular requirements of the system.
Figure 12:
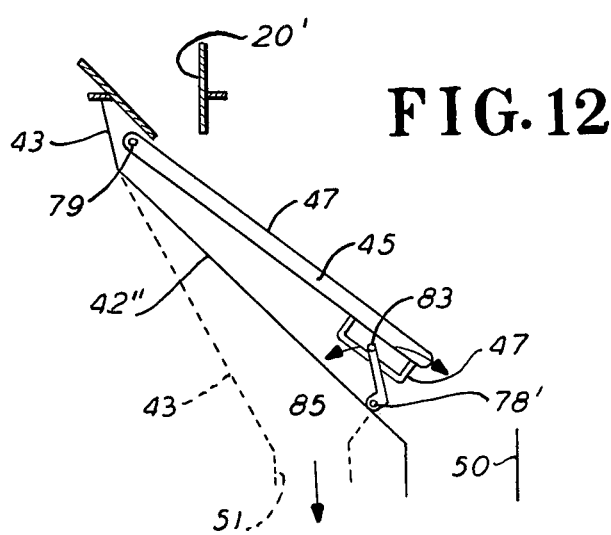
FIG. 12 is a partial schematic side view of one of the elongated bars and the arc shaped rod of FIG. 11, showing the angular adjustment of the arc shaped rod. The space under the bars allows fine material to pass from the chute. This figure also shows (in dotted lines) an alternative by-pass arrangement which can be utilized for separation of the fines falling through the spaces between the elongated bars from the main dry solids streams flowing over the top of the bars.

FIGS. 11 and 12 show how the spreading principle of this invention can be utilized in a different type of device, having an adjustable conical metal spreading surface rather than an adjustable dam which forms a stationary dry solids mass spreading surface. In this embodiment of the invention, a series of diverging bars 45 are positioned above the bottom chute wall 42″ and the dry solids stream flows downwardly, over the upper surfaces 47 of these bars, from the inlet 20' to the discharge opening 50. The bars at their upper end are each pivotally mounted on a stationary rod 79, and are rotated about the longitudinal axis of this rod by a curved bar 83 carried by a yoke 81, 85 rotatable about a pivot 78'. As the yoke is adjusted about its pivot 78' the bar 83 is moved either toward or away from the plane of the bottom chute wall 42″, thus forming a generally conical surface of small transverse curvature (when the bars are close to chute wall 42″) or a generally conical surface of large transverse curvature (when the bars are raised to a high position farther away from the chute wall 42″). Thus, as in the preceding figures, a spreading surface (the top surfaces 47 of bars 45) can be formed of exactly the desired degree or amount of transverse curvature (transverse to the direction of stream flow) to provide the exact amount of spreading action required in the dry solids stream flowing downwardly over the adjustable bars 45.

There are spaces between the bars 45 and the smaller particles or "fines" in the dry solids stream will fall through these spaces onto the bottom chute wall 42″ and from there pass either into the same discharge opening 50 which receives the stream flowing over the bars or, in the alternative arrangement shown in dotted lines in FIG. 12 wherein the bottom chute wall 43 is connected with a separate discharge opening, will be bypassed into the said separate opening and thus separated from the stream which passes over the bars 45.

The larger particles and lumps, too big to pass through the spaces between the bars 45, flow downwardly over the surfaces 47 of the bars, spreading as they flow, and are discharged as a uniformly spread stream into the discharge opening 50.

Adjustment of the carrier rod 83 on which the lower end of each bar 45 is mounted, about axis 78', causes the bar surfaces 47 to form a conical spreading surface of greater or less transverse curvature, as the case may be, and thus to act like the dam 76 in the preceding figures to provide a greater or lesser spreading of the stream of large particles and lumps which flow downwardly over the bars and discharge into the opening 50, depending on the angular position in which the yoke 81, 85 is set with respect to the axis 78'.

Figure 4:
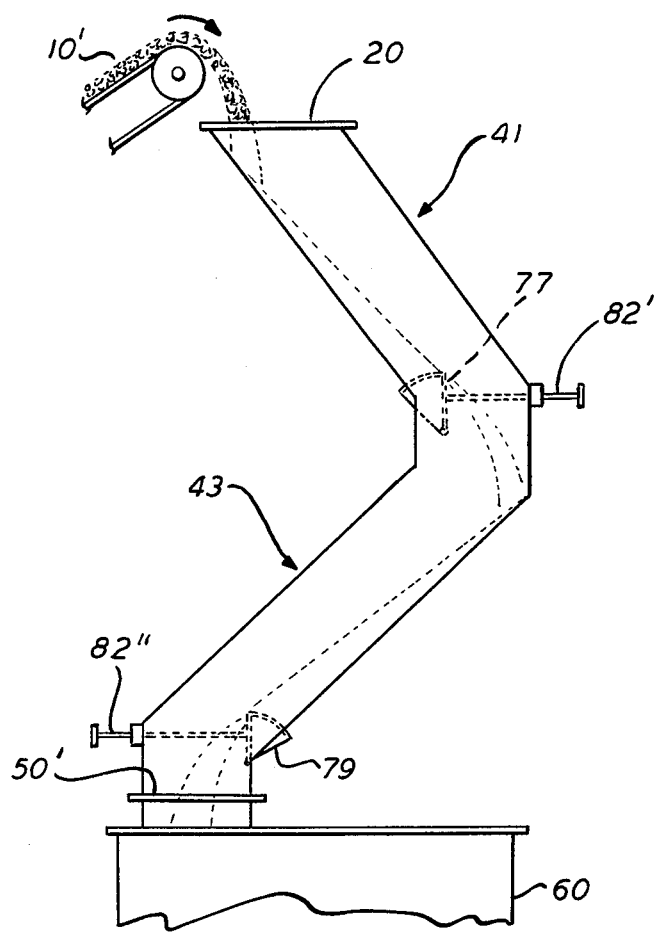
FIG. 4 is a side elevational view, on a reduced scale, showing the apparatus of FIG. 1 in modified form so that it acts as a split spreader, with the lower half directed at a reverse angle to the upper half.
Figure 7:
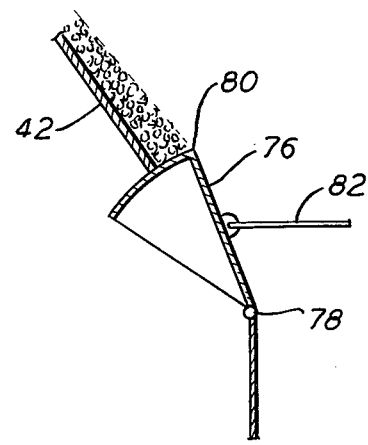
FIG. 7 is a view like FIG. 1A, but with the dam positioned in a different intermediate position than is shown in FIG. 1A.
Figure 6:
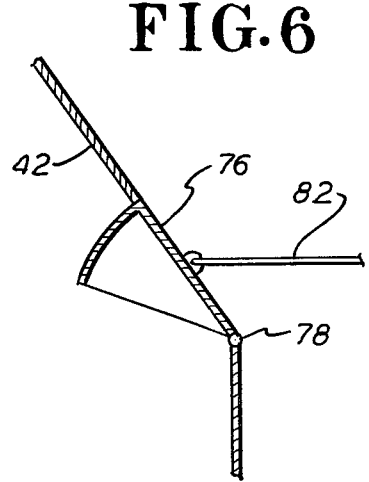
FIG. 6 is an enlarged cross-sectional view of the dam of FIG. 1, with the dam positioned in the fully open, non-blocking position.
Figure 5:
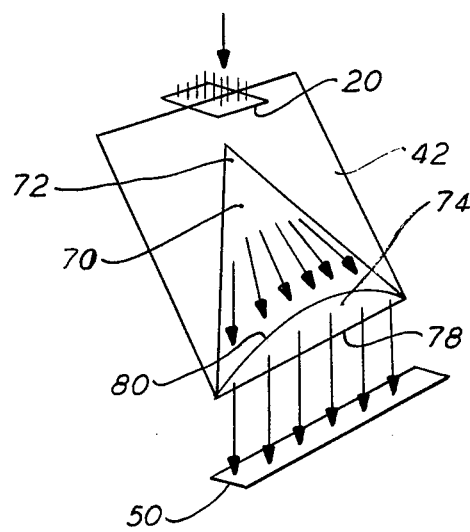
FIG. 5 is a schematic isometric view showing how the adjustable dam of the present invention operates to spread uniformly a dry solid stream flowing from an inlet to an outlet.

In a typical example of a spreading operation conducted with the apparatus, and by the method, of the present invention coal within the size range from 5″ x down (0), moving to a crusher at the rate of 2000 tons/hour, is discharged onto the spreader in a stream of approximately 3' width. As it flows down the spreader, the cone-shaped spreading surface causes the stream of coal to spread, from its 3' width at the top of the spreader to an approximate 10' width at the bottom of the spreader, at the location where it is discharged into the inlet to the crusher. The spreading surface is adjusted in transverse shape or contour, as explained above, so that the spreading of the stream will be uniform, across its entire width. The thickness, or depth, of the coal stream of course is reduced as the stream is spread, for example from a depth of one to two feet deep at the inlet to the spreader to a depth of only a few inches at the exit end of the spreader. When the apparatus used has two spreading sections as in FIG. 4, the stream typically could be spread from its original 3' width at the entrance to the first spreader section, to a width of 6' at the end of the first spreader section. It would then enter the second, or lower spreader section at a width of 6' and be further spread in that section to the 10' width desired where it leaves the second spreader section and enters the crusher.

Whether the apparatus be in the form of FIGS. 1 and 2, FIG. 3, FIG. 4, FIGS. 8 through 10, or FIGS. 11 and 12, the transverse shape or contour of the spreading surface can be varied or adjusted until it is in exactly that shape which will provide those spreading characteristics which result in uniform thickness of the coal stream, without material segregation by particle size, at the discharge location where it enters the crusher.

It is to be understood that the adjustable dam 76 of this invention is not limited to the particular form shown in the drawings. Other forms may be used which are movable from a blocking position normal to the direction of flow of the dry solids stream to an open position parallel to said direction of flow and which are provided with means to allow the dam to be adjusted (i.e., rotated) while the dry solids stream is flowing, without said rotation being prevented or obstructed by that portion of the stationary mass of dry solids which rests against the dam face. In the case of the slider bar arrangement of FIGS. 11 and 12, it is not necessary to have spaces between the bars. If it is desired to have all the dry solids flow over the bars and drop into the crusher opening the bars can either be spaced close together, so that the spaces between adjacent bars is not significant, or a bridging web or membrane, flexible enough to allow relative adjusting movement of adjacent bars, could be provided between adjacent bars to prevent dry solids from dropping through the said spaces.

I claim:
1. Apparatus for spreading a stream of dry solids in transit between an inlet location and an outlet location comprising, a chute over which said dry solids stream flows downwardly from said inlet location to said outlet location, a dam for creating in said dry solids stream as it flows down said chute a stationary mass of said dry solids having a convex upper surface which is curved transversely with respect to the direction of stream flow and which acts to spread the stream of dry solids flowing thereover, and means for adjusting the dam to an angular position within the range from zero degrees to ninety degrees relative to the direction of flow of said stream of dry solids passing thereover for controlling the convexity of the upper surface of said stationary mass of dry solids.

2. Apparatus according to claim 1, in which the transversely curved surface has the general shape of the surface of a segment of a right circular cone.

3. Apparatus according to claim 1, in which means are provided for vibrating the chute as the dry solids stream flows thereover.

4. In a spreading device for spreading a dry solids stream as it flows down a chute, an adjustable dam having a crest which is curved transversely with respect to the direction of flow of said stream for stopping the flow of a portion of said dry solids to form a stationary mass thereof having an upper convex surface over which the flowing particles of the stream pass after the said stationary mass has formed, and means for adjusting said dam to vary the convexity of the said surface of said stationary mass for increasing or decreasing the degree of spreading of the stream flowing thereover.

5. Apparatus according to claim 4, in which the curved crest of said dam is in the shape of a generally hyperbolic curve.

6. Apparatus according to claim 4, in which the curved crest of said dam is in the shape of a generally parabolic curve.

* * * * *